United States Patent Office 3,536,597
Patented Oct. 27, 1970

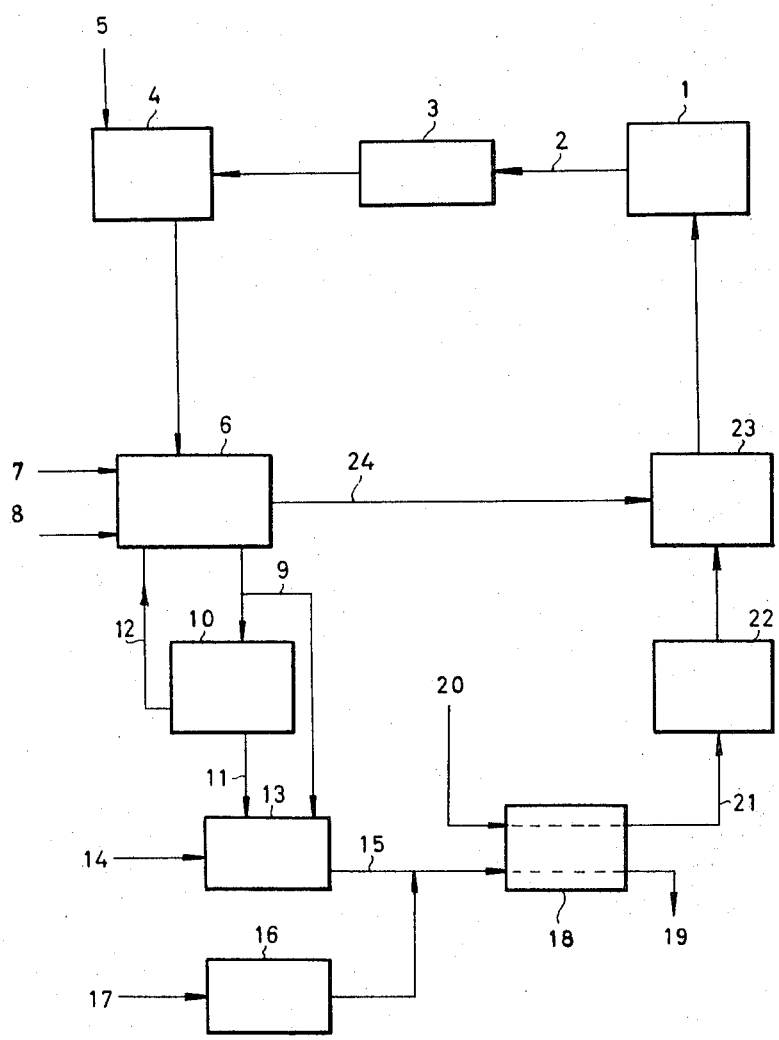

3,536,597
PROCESS FOR RECOVERING MERCURY FROM A MERCURY-CONTAINING SLUDGE
Katsuji Yamori, Munetada Takatoku, Akimitsu Miyahara, Takaaki Omagari, and Masao Kitamura, Tokyo, Japan, assignors to Toyo Soda Manufacturing Co., Ltd., Oaza Tonda, Yamaguchi-ken, and Japan Organo Co., Ltd., Tokyo, Japan
Filed Oct. 19, 1967, Ser. No. 676,512
Claims priority, application Japan, Oct. 20, 1966, 41/69,145
Int. Cl. C01d 1/08
U.S. Cl. 204—99                           11 Claims

ABSTRACT OF THE DISCLOSURE

Mercury is recovered from mercury-containing sludge—obtained from "the mercury process" for the electrolytic production of caustic alkali and chlorine—by dissolving the sludge in aqueous acid and then adsorbing the mercury content of the resultant solution on an anion exchange resin from which the mercury can be eluted and recovered from the resultant eluate.

---

The present invention relates to a process for recovering mercury from sludge from a purification tank for the purification of saturated alkali chloride solution obtained in the production of caustic alkali and chlorine by the electrolysis of alkali chloride solution in the so-called "mercury process."

In the electrolysis of alkali chloride solution by the mercury process, alkali chloride is usually dissolved in water to a concentration of about 300 grams per liter and this saturated alkali chloride solution is introduced into an electrolytic cell fitted with a mercury cathode. The electrolysis is then carried out and thereby sodium amalgam is produced at the mercury cathode and chlorine gas is generated at the anode and collected therefrom.

According to the above electrolytic step, about 10 percent of the alkali chloride in the influent alkali chloride solution is electrolyzed, after which it is exhausted from the electrolytic cell. (Hereinafter this alkali chloride solution will be called "depleted brine.")

Additional alkali chloride is dissolved in this depleted brine to produce again the saturated alkali chloride solution and the said saturated alkali chloride solution, from which impurities such as $Ca^{++}$, $Mg^{++}$ and $SO_4^{--}$ mixed together with the additional alkali chloride are removed in a purification step, is again circulated into the electrolytic cell.

According to the above system, the depleted brine flowing out of the electrolytic cell contains mercury in the range of several milligrams per liter to two scores or more milligrams per liter.

This is believed due to mercury used as cathode being oxidized by chlorine generated at the anode, with production of an aqueous soluble compound.

Hitherto, the mercury contained in above brine was removed from the above-mentioned purification step and discarded as mud.

The loss of mercury is a serious problem from the viewpoint of economics and public hazard.

The present invention comprises dissolving the sludge or a cake filtered from the sludge into an acidic liquid, for the sake of converting the mercury in the sludge into soluble salt form or the like, after which the mercury solution obtained is contacted with anion exchanger, with or without prior neutralization. The mercury which is adsorbed on the anion exchanger is then eluted, preferably with hydrochloric acid. When the eluate is used for adjusting the pH value of the purified, saturated alkali chloride solution, the recovered mercury is collected as metallic mercury by means of electrolytic reduction in the electrolytic cell.

An example of the process of the present invention, wherein sodium chloride is electrolyzed for producing caustic soda, is illustrated with reference to the attached drawing.

The figure shows a flow sheet in a process of mercury recovery and treatment in accordance with the process of the present invention. Reference numeral 1 designates an electrolytic cell, wherein purified saturated brine is electrolyzed and run out as a depleted brine via conduit 2. The said brine 2 is dechlorinated in a dechlorinating apparatus 3 and then runs into a salt-dissolving tank 4. Sodium chloride is added at 5 to the depleted brine in the salt-dissolving tank 4 to produce a saturated salt solution and the resultant solution is fed into a brine purification tank 6, where the necessary amount of sodium carbonate and caustic soda are added, via inlets 7 and 8 respectively, for removing impurities such as $Ca^{++}$, $Mg^{++}$ and other heavy metal ions therefrom, these impurities being precipitated. In this case, mercury dissolved in the depleted brine is precipitated together with other impurities.

The sludge from tank 6 passes via conduit 9 to dissolving tank 13 while filter cake 11 filtered from the sludge by means of a filter 10 also goes to tank 13, wherein dissolution is effected with the aid of an acidic liquid, supplied through a conduit 14. The filtrate, namely saturated salt solution from the filter 10 is recovered in the brine purification tank 6, to which it is led through conduit 12.

The solution produced in the dissolving tank 13 in which the sludge from 9 is dissolved is subjected to removal by mercury adsorption by bringing it in contact via conduit 15 with anion exchanger 18. At this point, the said solution, provided via 15, may be neutralized with alkali, supplied at 17, in a neutralizing tank 16 and then brought into contact with the anion exchanger 18. The effluent, leaving at 19, is then discarded. Subsequently, the mercury adsorbed in the anion exchanger 18 is eluted with hydrochloric acid supplied at 20; and the eluate, containing mercury, is supplied via conduit 21 to a storage tank 22.

On the other hand, the saturated salt solution purified in the brine purification tank 6 has a pH value in the range of 10 to 11, so that it has to be neutralized; this is accomplished with the aid of acid in a neutralizing tank 23.

The eluate, containing mercury, from the anion exchanger 18 is added, as an acidic liquid for neutralization, into the neutralizing tank 23 which contains purified salt solution, supplied via conduit 24, the purified salt solution being simultaneously neutralized and the mercury in the eluate transferred to the purified saturated salt solution. Thus, the mercury adsorbed on the anion exchanger 18 is dissolved in the purified, saturated salt solution, coming via conduit 24, and the said solution, retaining its purified and saturated state is circulated back into the electrolytic cell 1.

The sodium chloride is electrolyzed in the electrolytic cell 1, where the mercury in the purified saturated salt solution is simultaneously electrolyzed and is reduced to metallic mercury, which is then recovered.

The process of the present invention comprises a combination of the various above-described steps and a process of recovering mercury from sludge in the brine purification tank; however, the neutralization after dissolution of the sludge is not a necessary step and the sludge may be treated with the anion exchanger without being neutralized, i.e. eliminating the neutralization.

However, in this case, the solution, having strong acidity, may decrease the adsorption capacity of the anion exchanger for mercury and the neutralization procedure is therefore recommended.

The acid used for dissolving the cake, obtained by filtering the sludge, may be an acid, selected from among the common acids, which forms a complex anion together with mercury or an anion containing mercury. Practically, hydrochloric acid is employed for this purpose. If the sludge is directly dissolved in hydrochloric acid, satisfactory chlorine ions to form mercury complex anion are present in the said sludge so that any acid may be employed for the purpose.

The acid used for elution of adsorbed mercury from the anion exchanger may be any acid and the acid used for neutralization of the purified salt solution is advantageously employed. Practically, hydrochloric acid is most commonly used and (if hydrochloric acid having a higher concentration is used, the elution efficiency is more enhanced), usually, hydrochloric acid having 35 percent concentration is directly used.

However, if the necessary amount of hydrochloric acid for the elution surpasses the amount of hydrochloric acid for the neutralization of the purified salt solution, difficulty may be encountered in industrializing the process of the present invention.

Various studies in this respect have been carried out. For example, in the case of treating the depleted brine with anion exchanger, the depleted brine has a low concentration of mercury and so the anion exchanger shows an inferior capacity of adsorbing mercury, namely 10 grams of mercury per liter of resin or less. Therefore, the amount of hydrochloric acid for this elution is increased to several multiples of the amount of hydrochloric acid ordinarily required for the neutralization. According to the process of the present invention, the concentration of mercury in the solution treated with anion exchanger is in excess of 500 milligrams per liter, the anion exchanger shows a mercury-adsorbing capacity of 60 grams of mercury per liter of resin, and the amount of hydrochloric acid for elution is less than the amount of the same for neutralization.

The increased adsorbing capacity of the anion exchanger due to increased mercury concentration is an important factor in the present invention. One example of the relationship between mercury concentration and adsorbing capacity of anion exchanger is set forth below:

| Concentration of mercury, mg./l. | Amount of adsorbed mercury by anion exchanger. Amberlite (IRA–900)[1] |
|---|---|
| 5 | 10 g./l. resin. |
| 50 | 40 g./l. resin. |
| 500 | 60 g./l. resin. |
| 2,000 | 140 g./l. resin. |

[1] Macroreticular ion exchange resin based on styrenedivinylbenzene copolymers, the functionality being of the

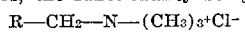

type; i.e. a strong base anion exchange resin.

The anion exchanger used for the present invention may be strongly basic or weakly basic; and may be solid material or liquid material, e.g. anion exchange resin or liquid anion exchanger.

The present invention has been explained above, by taking the electrolysis process of sodium chloride as an example. The present invention may also be applied to the process of manufacturing caustic alkali from raw materials, such as potassium chloride or lithium chloride.

Presently preferred examples of typical embodiments of the invention follow.

EXAMPLE I

A saturated aqueous sodium chloride solution, containing 5 milligrams of mercury per liter was purified in a brine purification tank, and a sludge containing 550 mg. of mercury per liter was obtained. The cake obtained after filtering the sludge was dissolved in hydrochloric acid and the resultant solution was neutralized with caustic soda at pH 4 and after filtration a solution having a mercury concentration of 1,500 milligrams of mercury per liter was obtained.

This solution was fed for five hours at a flow rate of 10 liters per hour into an ion exchange resin column which was filled with one liter of Amberlite (IRA–900), the resin adsorbing the mercury. The effluent from the resin column showed a mercury concentration of 0.5 mg. of mercury per liter or less.

Furthermore, the amount of mercury adsorbed on the resin was 74 grams of mercury.

The resin with mercury adsorbed thereon was treated with 20 kilograms of 35 percent hydrochloric acid for elution of the mercury, which was thus almost completely eluted. The mercury-containing eluate was added to a purified saturated salt (NaCl) solution having a pH value of 10.0 and then the pH of the said solution was adjusted to 7 to 8.

Mercury in the amount of 5 mg. was contained in one liter of the purified saturated salt solution, neutralized as above. This purified saturated salt solution was electrolyzed in a mercury electrolytic cell, whereby the depleted brine showed a concentration of about 5 milligrams of mercury per liter, or no particular increase of mercury. The mercury in the purified saturated salt solution was reduced and recovered in the electrolytic cell and, on the other hand, metallic mercury was simultaneously oxidized, no loss of mercury being observed in any of the steps.

EXAMPLE II

Sludge obtained as in Example I, but not filtered, was dissolved in 98 percent sulphuric acid, thereby obtaining a resultant solution having a mercury concentration of 525 mg. of mercury per liter.

This resultant solution was fed at a flow rate of 20 liters per hour for six hours into a resin column which was filled with one liter of weakly basic anion exchange resin, Amberlite (IRA–93), whereby the said resin adsorbed mercury. (Amberlite IRA–93 is a styrene-divinylbenzene copolymer type, macroreticular ion exchange resin with an $R—CH_2—N—(CH_3)_2$ functionality, i.e. a weak base anion exchange resin possessing tertiary amine functionality.)

The effluent from the resin column then indicated 0.5 mg. per liter as the concentration of mercury and the amount of mercury adsorbed on the resin was 63 grams. The resin carrying adsorbed mercury was treated with 32 kilograms of 30 percent sulphuric acid for elution of mercury, and in this manner the mercury was completely eluted.

This mercury-containing eluate was added into a purified saturated aqueous salt (NaCl) solution having a pH value of 10.5 and the resultant solution was neutralized to a pH value of 7 to 8.

The concentration of mercury in this neutralized salt solution was 4.8 mg. per liter. Then this purified, saturated salt solution was electrolyzed in a mercury electrolytic cell, whereby the depleted brine showed about 5 mg. per liter as the concentration of mercury without increase. The mercury was reduced and recovered in the electrolytic cell, after the manner of Example I.

EXAMPLE III

Sludge obtained as in Example I was not filtered, and had added thereto a concentrated hydrochloric acid, a solution having a 480 mg. per liter of mercury concentration being obtained. This solution was brought into contact with 0.1 N kerosene solution, containing liquid anion exchanger Amberlite (LA–2), and the mercury was extracted in the kerosene phase. The solution after extraction showed a mercury concentration of 1 mg. per liter or less, and the extracted amount of mercury was 47.8 grams per one equivalent of liquid ion exchanger.

The liquid anion exchanger containing mercury was treated with 35 percent hydrochloric acid and thereby the mercury in the liquid anion exchanger was completely eluted and transferred into the hydrochloric acid phase.

The mercury-containing eluate was added to a purified, saturated aqueous salt (NaCl) solution having a pH value of 10.5 and thereby the pH value was neutralized to the range of 7 to 8.

In this example, the said salt solution showed a mercury concentration of 4.7 mg. per liter. The mercury in the said salt solution was reduced and recovered after the manner described in the preceding examples.

What is claimed is:

1. A process for recovering mercury from a sludge produced in a purification tank for alkali chloride solution in the production of caustic alkali and chlorine by the electrolysis of alkali chloride by the mercury process, which comprises treating said alkali chloride solution with sodium carbonate and sodium hydroxide to obtain a sludge, dissolving said sludge in an acid, bringing the resultant dissolved sludge into contact with an anion exchanger to absorb mercury, eluting said anion exchanger containing absorbed mercury with concentrated strong acid, thereby to transfer said absorbed mercury to the eluent, adding the eluent from said anion exchanger to a purified alkali chloride solution for neutralization thereof, and feeding thus neutralized, purified alkali chloride solution into an electrolytic cell.

2. A process for recovering mercury according to claim 1, wherein the sludge is dissolved in an acid and neutralized with an alkali and then is brought into contact with anion exchanger.

3. A process for recovering mercury according to claim 1, wherein cake obtained by filtering the sludge in a purification tank of alkali chloride solution is dissolved in an acid and then is brought into contact with anion exchanger.

4. A process for recovering mercury according to claim 1, wherein cake obtained by filtering the sludge in a purification tank for alkali chloride solution is dissolved in an acid, neutralized with an alkali, and then is brought into contact with anion exchanger.

5. A process for recovering mercury according to claim 1, wherein the sludge from the purification tank for alkali chloride solution, with or without filtering, is dissolved in an acid and is brought into contact with strongly basic anion exchange resin.

6. A process for recovering mercury according to claim 1, wherein the sludge from the purification tank for alkali chloride solution, with or without filtering, is dissolved in an acid and is brought into contact with weakly basic anion exchange resin.

7. A process for recovering mercury according to claim 1, wherein the sludge from the purification tank for alkali chloride solution, with or without filtering, is dissolved in an acid and is brought into contact with liquid anion exchanger.

8. A process according to claim 1, wherein the anion exchanger with adsorbed mercury is subjected to elution with an acid selected from the group consisting of concentrated hydrochloric acid and sulphuric acid.

9. A process according to claim 6, wherein the anion exchanger with adsorbed mercury is subjected to elution with an acid selected from the group consisting of concentrated hydrochloric acid and sulphuric acid.

10. A process according to claim 7, wherein the anion exchanger with adsorbed mercury is subjected to elution with an acid selected from the group consisting of concentrated hydrochloric acid and sulphuric acid.

11. A process according to claim 5, wherein the anion exchanger with adsorbed mercury is subjected to elution with an acid selected from the group consisting of concentrated hydrochloric acid and sulphuric acid.

References Cited

UNITED STATES PATENTS

| | | | |
|---|---|---|---|
| 3,085,859 | 4/1963 | Scholten et al. | 204—99 X |
| 3,213,006 | 10/1965 | Crain et al. | 204—99 |

FOREIGN PATENTS

| | | |
|---|---|---|
| 772,226 | 4/1957 | Great Britain. |
| 595,813 | 4/1960 | Canada. |

DANIEL E. WYMAN, Primary Examiner

W. J. SHINE, Assistant Examiner